US010747554B2

United States Patent
Chung et al.

(10) Patent No.: US 10,747,554 B2
(45) Date of Patent: Aug. 18, 2020

(54) CONTEXTUAL TASK SHORTCUTS

(71) Applicant: Google Inc., Mountain View, CA (US)

(72) Inventors: Eunkyung Chung, Mountain View, CA (US); Thomas Weedon Hume, Mountain View, CA (US); Michael Andrew Cleron, Menlo Park, CA (US); Michael Adam Cohen, Mountain View, CA (US); Makoto Onuki, Mountain View, CA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 15/374,110

(22) Filed: Dec. 9, 2016

(65) Prior Publication Data

US 2017/0277396 A1 Sep. 28, 2017

Related U.S. Application Data

(60) Provisional application No. 62/313,097, filed on Mar. 24, 2016.

(51) Int. Cl.
*G06F 3/0488* (2013.01)
*G06F 9/451* (2018.01)
(Continued)

(52) U.S. Cl.
CPC ............ *G06F 9/451* (2018.02); *G06F 3/0482* (2013.01); *G06F 3/04817* (2013.01); *G06F 3/04883* (2013.01)

(58) Field of Classification Search
CPC ............. G06F 3/04883; G06F 3/04817; G06F 3/0488; G06F 3/0482; G06F 9/451
See application file for complete search history.

(56) References Cited

U.S. PATENT DOCUMENTS

D696,266 S 12/2013 d'Amore et al.
D711,395 S 8/2014 Hanson et al.
(Continued)

FOREIGN PATENT DOCUMENTS

CN 101778147 A 7/2010
CN 102479028 A 5/2012
(Continued)

OTHER PUBLICATIONS

Response to Combined Search Report and Examination dated Aug. 16, 2017, from GB Application No. GB1704508.9, filed Mar. 23, 2018, 4 pp.
(Continued)

*Primary Examiner* — Andrea C Leggett
(74) *Attorney, Agent, or Firm* — Shumaker & Sieffert, P.A.

(57) ABSTRACT

In one example, a device includes one or more processors, a presence-sensitive display, and a storage device that stores one or more modules. The modules are executable to, responsive to receiving an indication of a first user input: output, for display, a graphical element including at least one task shortcut from a plurality of task shortcuts for an application, receive an indication of a second user input that selects a particular task shortcut included in the graphical element, and, responsive to receiving the indication of the second user input, output, for display, a shortcut icon for the particular task shortcut within the graphical user interface.

19 Claims, 5 Drawing Sheets

(51) Int. Cl.
    G06F 3/0481    (2013.01)
    G06F 3/0482    (2013.01)

(56) References Cited

U.S. PATENT DOCUMENTS

| | | | |
|---|---|---|---|
| 9,032,332 | B2 | 5/2015 | Chae et al. |
| D740,303 | S | 10/2015 | Perez et al. |
| D744,505 | S | 12/2015 | Wilberding et al. |
| D747,352 | S | 1/2016 | Lee et al. |
| D760,773 | S | 7/2016 | Cho et al. |
| D761,812 | S | 7/2016 | Motamedi |
| D783,676 | S | 4/2017 | Kim et al. |
| D788,785 | S | 6/2017 | Flood et al. |
| 2009/0328072 | A1 | 12/2009 | Shin et al. |
| 2011/0320477 | A1 | 12/2011 | Nestler et al. |
| 2012/0166180 | A1 | 6/2012 | Au |
| 2013/0173513 | A1 | 7/2013 | Chu et al. |
| 2014/0062853 | A1 | 3/2014 | Chaudhri et al. |
| 2014/0101617 | A1* | 4/2014 | Yang ................ G06K 9/00288 715/846 |
| 2016/0259499 | A1* | 9/2016 | Kocienda ............ G06F 3/0482 |
| 2017/0344197 | A1* | 11/2017 | Kolli .................. G06F 3/0482 |
| 2019/0146643 | A1 | 5/2019 | Foss et al. |
| 2019/0370824 | A1 | 12/2019 | Rathod |

FOREIGN PATENT DOCUMENTS

| | | |
|---|---|---|
| CN | 104346024 A | 2/2015 |
| CN | 104598109 A | 5/2015 |
| KR | 20090093444 A | 9/2009 |
| KR | 20140119611 A | 10/2014 |

OTHER PUBLICATIONS

Notice of Allowance from U.S. Appl. No. 29/571,026, dated Mar. 26, 2018, 6 pp.

Office Action from U.S. Appl. No. 29/571,026, dated Oct. 31, 2017, 5 pp.

Response to the Office Action dated Oct. 31, 2017, from U.S. Appl. No. 29/571,026, filed Dec. 19, 2017, 9 pp.

Notification for Patent Registration Formalities, and translation thereof, from counterpart Chinese Application No. 201630620108.0, dated Aug. 21, 2017, 4 pp.

Combined Search Report and Examination from counterpart United Kingdom Application No. GB1704508.9, dated Aug. 16, 2017, 5 pp.

Office Action from U.S. Appl. No. 29/571,026, dated Jun. 29, 2017, 6 pp.

Response to Office Action dated Jun. 29, 2017, from U.S. Appl. No. 29/571,026, filed Sep. 28, 2017, 12 pp.

Versluis, "3D Touch in iOS 9, Part 3: Adding Dynamic Shortcut Items", iOS Dev Diary [online]. Retrieved from the Internet: <http://pinkstone.co.uk/3d-touch-in-ios-9-part-3-adding-dynamic-shortcut-items/> Sep. 27, 2015, 6 pgs.

"Context menu", Wikipedia [online]. Retrieved from the Internet: <https://en.wikipedia.org/wiki/Context_menu> May 22, 2015, 3 pgs.

Chavanu, "Go Beyond Keyboard Shortcuts by Using Contextual Menus on Your Mac", MakeUseOf [online]. Retrieved from the Internet: <http://www.makeuseof.com/tag/go-beyond-keyboard-shortcuts-by-using-contextual-menus-on-your-mac/> Nov. 10, 2013, 5 pgs.

"3D Touch", Apple Inc. [online]. Retrieved from the Internet: <https://developer.apple.com/ios/3d-touch/> Mar. 21, 2016, 5 pgs.

"Launchify—Quick App Shortcuts", Emberify—Instant [online]. Retrieved from the Internet: <https://play.google.com/store/apps/details?id=com.emberify.launchify&hl=en> Jan. 28, 2016, 3 pgs.

"UIApplicationShortcutItem", Apple Inc. [online]. Retrieved from the Internet: <https://developerapple.com/reference/uikit/uiapplicationshortcutitem> Sep. 16, 2015, 2 pgs.

Rahul et al., "Context based adaption of application icons in mobile computing devices," 2013 Third World Congress on Information and Communication Technologies (WICT 2013), IEEE, Dec. 15, 2013, pp. 31-36.

International Seach Report and Written Opinion of International Application No. PCT/US2017/021133, dated May 17, 2017, 16 pp.

International Preliminary Report on Patentability of International Application No. PCT/US2017/021133, dated Oct. 4, 2018, 10 pp.

Examination Report from counterpart United Kingdom Application No. 1704508.9, dated Sep. 11, 2019, 3 pp.

First Office Action from counterpart Chinese Application No. 201710183584.4, dated Nov. 20, 2019, 18 pp.

The Notification of Reason for Refusal, and translation thereof, from counterpart Korean Application No. 1020187024512, dated Apr. 23, 2020, 12 pp.

Response to Communication pursuant to Rules 161(1) and 162EPC dated Oct. 31, 2018, from counterpart European Application No. 17712340.3, filed Apr. 8, 2019, 4 pp.

\* cited by examiner

CONTEXTUAL TASK SHORTCUTS

RELATED APPLICATION

This application claims benefit of U.S. Provisional Patent Application No. 62/313,097, filed Mar. 24, 2016, the entire content of which is hereby incorporated by reference.

BACKGROUND

Typically, in order to compose an email, obtain directions to a location, or perform another task using a mobile computing device (such as a smartphone), a user must instruct the device to launch a relevant application, select a particular user interface feature displayed by the device, and then select a recipient or specify other relevant information to ultimately accomplish the desired task. Further, the user must perform each step of the task each time he or she performs the task. Such interactions can be tedious, repetitive, and time consuming.

SUMMARY

In one example, a method includes outputting, by the mobile computing device and for display at a presence-sensitive display, a graphical user interface including at least a first graphical element associated with an application executable by the mobile computing device, and receiving, by the mobile computing device and from the presence-sensitive display, an indication of a first user input detected by the presence-sensitive display at a location of the presence-sensitive display associated with the first graphical element. The method may also include, responsive to receiving the indication of the first user input: outputting, by the mobile computing device and for display at the presence-sensitive screen, a second graphical element including at least one task shortcut from a plurality of task shortcuts for the application, wherein each task shortcut from the plurality of task shortcuts is associated with a respective action of the application, receiving, by the mobile computing device and from the presence-sensitive display, an indication of a second user input that selects a particular task shortcut from the at least one task shortcut included in the second graphical element, wherein the second user input is initiated at a location of the presence-sensitive display associated with a portion of the graphical element associated with the particular task shortcut, and responsive to receiving the indication of the second user input, outputting, by the mobile computing device, a shortcut icon for the particular task shortcut and within the graphical user interface.

In another example, a mobile computing device includes one or more processors, a presence-sensitive display, and a storage device that stores one or more modules. The one or more modules are executable by the one or more processors to output, for display at the presence-sensitive display, a graphical user interface including at least a first graphical element associated with an application executable by the mobile computing device, and receive, from the presence-sensitive display, an indication of a first user input detected by the presence-sensitive display at a location of the presence-sensitive display associated with the first graphical element. The one or more modules are further executable by the one or more processors to, responsive to receiving the indication of the first user input: output, for display at the presence-sensitive screen, a second graphical element including at least one task shortcut from a plurality of task shortcuts for the application, wherein each task shortcut from the plurality of task shortcuts is associated with a respective action of the application, receive, from the presence-sensitive display, an indication of a second user input that selects a particular task shortcut from the at least one task shortcut included in the second graphical element, wherein the second user input is initiated at a location of the presence-sensitive display associated with a portion of the second graphical element associated with the particular task shortcut, and, responsive to receiving the indication of the second user input, output, for display by the presence-sensitive display, a shortcut icon for the particular task shortcut and within the graphical user interface.

In another example, a computer-readable storage medium is encoded with instructions. The instructions, when executed, cause one or more processors of a computing device to output, for display at a presence-sensitive display, a graphical user interface including at least an first graphical element associated with an application executable by the mobile computing device and receive, from the presence-sensitive display, an indication of a first user input detected by the presence-sensitive display at a location of the presence-sensitive display associated with the first graphical element. The instructions may further cause the one or more processors to, responsive to receiving the indication of the first user input: output, for display at the presence-sensitive screen, a second graphical element including at least one task shortcut from a plurality of task shortcuts for the application, wherein each task shortcut from the plurality of task shortcuts is associated with a respective action of the application, receive, from the presence-sensitive display, an indication of a second user input that selects a particular task shortcut from the at least one task shortcut included in the second graphical element, wherein the second user input is initiated at a location of the presence-sensitive display associated with a portion of the second graphical element associated with the particular task shortcut, and, responsive to receiving the indication of the second user input, output, for display by the presence-sensitive display, a shortcut icon for the particular task shortcut and within the graphical user interface.

The details of one or more examples are set forth in the accompanying drawings and the description below. Other features, objects, and advantages of the disclosure will be apparent from the description and drawings, and from the claims.

DETAILED DESCRIPTION

Figure 1A:
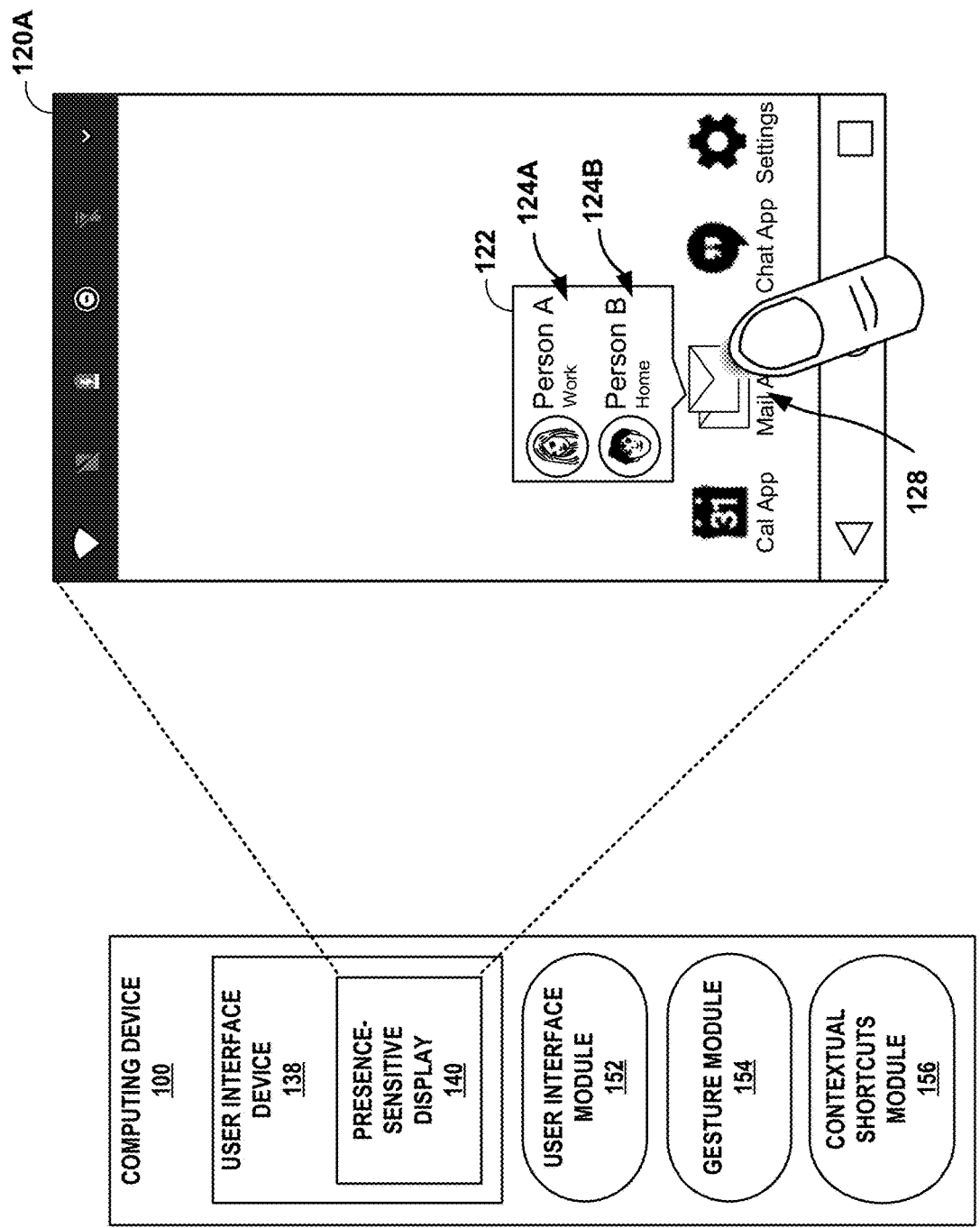
FIGS. 1A through 1C are conceptual diagrams illustrating an example computing device and graphical user interface that provides contextual task shortcuts, in accordance with one or more aspects of the present disclosure.

In general, techniques of this disclosure may enable a computing device to dynamically determine tasks associated with an application that a user may want to perform. For example, the computing device may determine, based on a context of the computing device, that a user may want to send an email to a desired recipient, obtain driving directions to the home residence of the user, listen to music performed by a particular musical group, etc. The computing device may receive a user input selection of an application icon in a graphical user interface and, in response, display a shortcut menu that includes one or more of the predicted tasks. The user may select one of the tasks and the computing device may then automatically begin performing the selected task without requiring the computing device to display the primary user interface for the application. For example, if the user selects a shortcut for composing an email to a desired recipient, the computing device may automatically execute an email application and display a user interface for composing an email message in which the "to" line is prefilled in with the email address of the desired recipient rather than displaying the default user interface that is typically displayed when the email application is executed. That is, the computing device may dynamically suggest actions associated with a particular application and present the suggested actions in response to detecting a gesture at an icon associated with the particular application such that the computing device does not need to display the primary user interface for the application in order to perform a suggested action.

In some examples, in addition to dynamically suggesting tasks and executing selected tasks without displaying the primary user interface for an application, the computing device may receive a user input to select one of the predicted task shortcuts from the shortcut menu and provide additional user input to situate a user interface element associated with the predicted task shortcut at a different location of the graphical user interface. Responsive to receiving the user input, the computing device may create a shortcut icon at or near the location of the graphical user interface at which the user input terminated. By creating the shortcut icon for the particular task, the user may simply select the shortcut icon to cause the computing device to begin performing the task rather than requiring the user to select the desired application icon to cause the computing device to display the task shortcut menu and then select the desired task from the task shortcut menu. In this way, techniques of this disclosure may reduce the number of user inputs required to perform various tasks, which may simplify the user experience and may reduce power consumption of the computing device.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

Figure 1C:
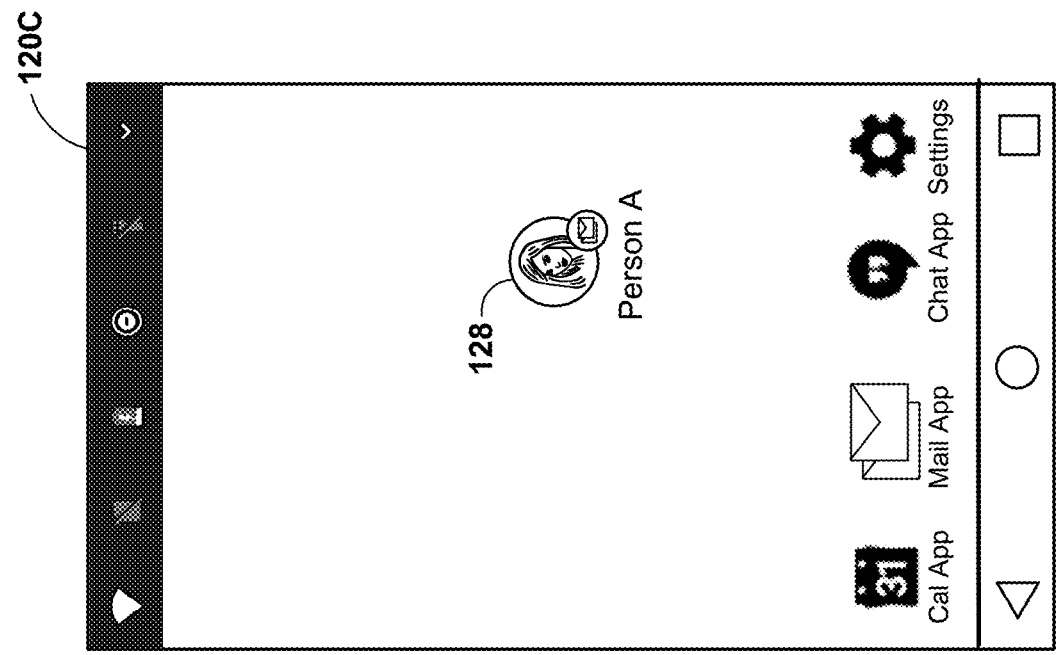
Figure 1B:
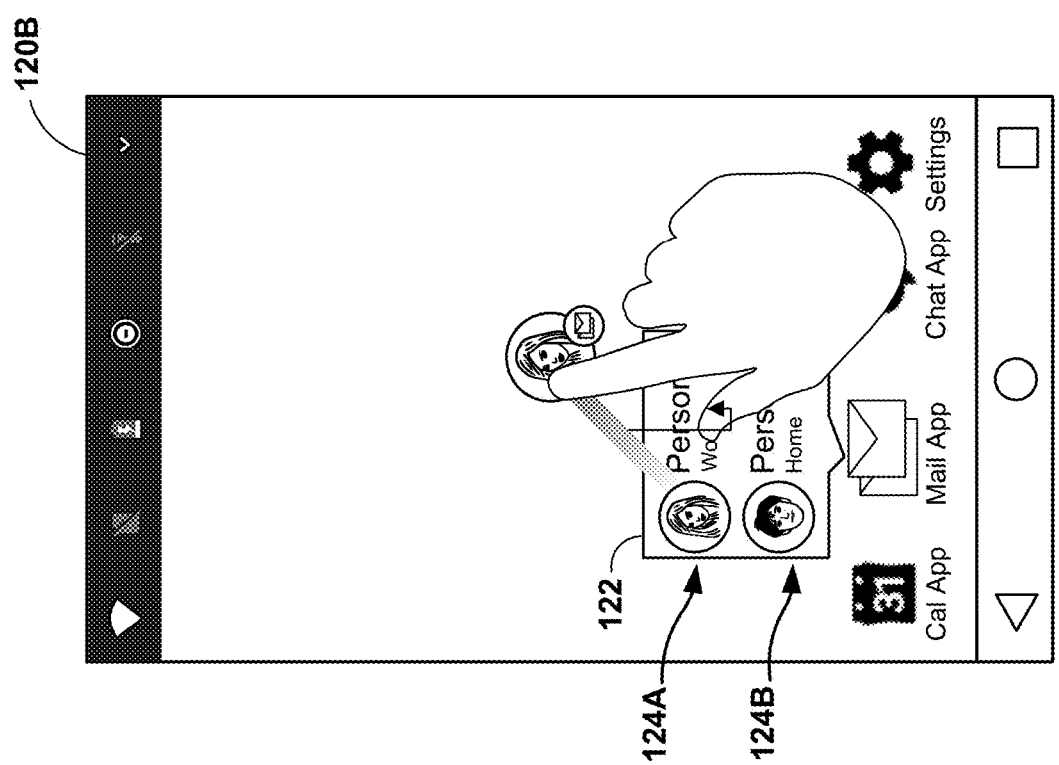

FIGS. 1A through 1C are conceptual diagrams illustrating an example computing device 100 and graphical user interface 120 that provides contextual task shortcuts 124A and 124B, in accordance with one or more aspects of the present disclosure. In the example of FIG. 1A, computing device 100 may include, be, or be a part of, one or more of a variety of types of computing devices, such as mobile phones (including smartphones), tablet computers, netbooks, laptops, personal digital assistants ("PDAs"), watches, and/or other types of devices. In other examples, computing device 100 may be one or more processors, e.g., one or more processors of one or more of the computing devices described above. As shown in FIG. 1A, computing device 100 includes user interface device (UID) 138, which, in turn, includes, or is communicatively coupled to, presence-sensitive display 140, as well as user interface (UI) module 152, gesture module 154, and contextual shortcuts module 156.

Computing device 100 may output graphical user interface (GUI) 120A for display using a variety of display devices, such as a presence-sensitive display (e.g., presence-sensitive display 140), or another type of input/output (I/O) capable display device (e.g., a touchscreen-enabled display device). For ease of explanation, this disclosure describes computing device 100 as including, or being communicatively coupled to, presence-sensitive display 140.

In some examples, computing device 100 may receive an indication of a user input, such as gesture 128, detected at presence-sensitive display 140. Gesture 128 may include a tap gesture, a swipe gesture (e.g., a substantially linear movement of one or more input points), a tap and hold gesture (e.g., tap and then hold for at least a threshold amount of time, such as 0.2 seconds, 0.5 seconds, 1 second, 2 seconds, etc.), or any other gesture. In other words, in this example, gesture 128 may be any single-touch or multi-touch gesture. In the example shown in FIG. 1, Also in this example, the substantially linear movement of the one or more input points may be substantially from one side of GUI 120 (e.g., a left side) to a different side of GUI 120 (e.g., a right side). The gesture may be initiated and terminated at locations of presence-sensitive display 140, including within the display area of presence-sensitive display 140. For example, as shown in FIG. 1A, gesture 128 is initiated at a location of presence-sensitive display 140 at which an icon associated with a mail application is displayed.

Responsive to presence-sensitive display 140 detecting gesture 128, presence-sensitive display 140 may provide an indication of gesture 128 to gesture module 154. Gesture module 154 may analyze the indication of gesture 128 and determine a type of a gesture associated with gesture 128. For example, gesture module 154 may determine that gesture 128 is a tap and hold gesture. In other examples, gesture module 154 may determine that a gesture detected by presence-sensitive display 140 may be a tap gesture, swipe gesture, a double tap gesture, a drag gesture, a multi-finger gesture, etc. In some instances, gesture module 154 may provide an indication of the type of gesture 128 to user interface module 152.

Responsive to receiving the indication of the gesture, user interface module 152 may output, for display by presence-sensitive display 140, an updated GUI 120A that includes contextual task shortcut menu 122. In the example of FIG. 1A, in response to detecting gesture 128, user interface module 152 outputs contextual task shortcut menu 122 above the icon associated with the mail application. As shown in FIG. 1A, contextual task shortcut menu 122 includes task shortcut 124A and 124B (collectively, "task shortcuts 124"). Task shortcuts 124 are graphical elements that includes an image of a user, the user's name (e.g., "Person A"), and an indication of an email address of the user (e.g., "work", "home", etc.). Contextual shortcuts module 156 may determine which task shortcuts to include within contextual task shortcut menu 122 based on a context of computing device 100. Contextual shortcuts module 156 may collect contextual information associated with computing device 100 to define a context of computing device 100. Contextual shortcuts module 156 may be configured to define any type of context that specifies the characteristics of the physical and/or virtual environment of computing device 100 at a particular time.

As used throughout the disclosure, the term "contextual information" is used to describe any information that can be used by contextual shortcuts module 156 to define the virtual and/or physical environmental characteristics that a computing device, and the user of the computing device, may experience at a particular time. Examples of contextual information are numerous and may include: semantic location (e.g., at home, in a car, at work, driving, walking, etc.), user actions taken to open an application, recently installed applications, status of a headphone connection, user behavior history, time and date information, sensor information generated by sensors (e.g., position sensors, accelerometers, gyros, barometers, ambient light sensors, proximity sensors, microphones, and any other sensor) of computing device 100, communication information (e.g., text based communications, audible communications, video communications, etc.) sent and received by communication modules of computing device 100, and application usage information associated with applications executing at computing device 100 (e.g., application data associated with applications, Internet search histories, text communications, voice and video communications, calendar information, social media posts and related information, etc.). Further examples of contextual information include signals and information obtained from transmitting devices that are external to computing device 100. For example, contextual shortcuts module 156 may receive, via a radio or communication unit of computing device 100, information from one or more computing devices proximate to computing device 100.

Based on contextual information collected by contextual shortcuts module 156, contextual shortcuts module 156 may define a context of computing device 100. Based on the context, contextual shortcuts module 156 may determine one or more contextual task shortcuts to include within contextual task shortcut menu 122. For example, if the context of computing device 100 includes an indication that a user is running late for a meeting, contextual shortcuts module 156 may determine that the user of computing device 100 may want to email or message someone associated with the meeting (e.g., person A or person B). Contextual shortcuts module 156 may determine that an email address of person A associated with the meeting is a work email address while an email address of person B associated with the meeting is a personal email address. As shown in FIG. 1, based on the determined context of computing device 100, contextual shortcuts module 156 determined to include task shortcuts 124A and 124B within contextual task shortcut menu 122.

In some examples, contextual shortcuts module 156 may generate, based on the current context, a relevance score for possible tasks associated with each application. Continuing the above example, as contextual shortcuts module 156 has determined that the user is running late for a meeting, the task of sending an email to the meeting attendees is given a relevance score greater than the task of sending an email to a family member of the user. As another example, if a user recently received a text message from person A, contextual shortcuts module 156 may determine that the relevance score for the task of sending a text message to person A is higher than the relevance score for the task of sending a text message to a different person who has not recently texted the user of computing device 100.

Using the relevance scores, contextual shortcuts module 156 may determine which task shortcuts to include within task shortcut menu 122. Contextual shortcuts module 156 may, in some examples, select a number (e.g., 2, 3, or 4) of task shortcuts for a particular application that have the greatest determines relevance scores of the possible tasks associated with the particular application. In some instances, contextual shortcuts module 156 may include only task shortcuts for tasks having a relevance score that satisfies a threshold relevance score. That is, contextual shortcuts module 156 may only include task shortcuts for tasks that are determined to have at least some minimum amount of relevance to the current context of computing device 100. Contextual shortcuts module 156 may also enforce a maximum or minimum number of task shortcuts to include in task shortcut menu 122. In such instances, even if fewer than the minimum number of tasks have a relevance score that satisfies the threshold relevance score, contextual shortcuts module 156 may still include the minimum number of task shortcuts in task shortcut menu 122. In such an example, contextual shortcuts module 156 may include a default set of task shortcuts or the task shortcuts having the greatest relevance score even though their relevance scores do not satisfy the threshold. In instances where more than a maximum number of tasks have relevance scores that satisfy the threshold relevance score, contextual shortcuts module 156 may select a portion of those tasks for inclusion within task shortcut menu 122. Contextual shortcuts module 156 may select the task shortcuts for inclusion by, for example, selecting the task shortcuts for tasks having the greatest relevance scores.

Contextual shortcuts module 156 may also change the ordering of the task shortcuts based, for example, on the relevance scores for each of the possible task shortcuts. Rather than always including a default list or ordering to task shortcuts, contextual shortcuts module 156 may not only change the particular shortcuts included in task shortcut menu 122, but also the position of each task shortcut within task shortcut menu 122. As the current context of computing device 100 changes (e.g., including updated application usage information, task shortcut usage information, location information, etc.), contextual shortcuts module 156 may determine an updated current context of computing device 100 and may update the relevance scores for the various tasks associated with each application. While contextual shortcuts module 156 may determine that the same task shortcuts should still be included within task shortcut menu 122, contextual shortcuts module 156 may determine that the ordering may change such that the task shortcut for the task having the greatest relevance score is always positioned at the top (or bottom) of the task shortcut menu 122. In this way, the task shortcuts associated with the most relevant tasks may always be positioned in a consistent location within task shortcut menu 122, which may make it easier for a user to select the desired task.

In some examples, after UI module 152 causes contextual task shortcut menu 122 to be displayed within GUI 120A, presence-sensitive display 140 may detect a second gesture (e.g., a tap gesture) at a location of one of the task shortcut icons 124 or termination of the first gesture (e.g., release of a tap-and-hold gesture) at a location of one of the task shortcut icons 124. In response to detecting the termination of the first gesture or detecting the second gesture, computing device 100 may execute the task associated with the task shortcut associated with the location at which the first gesture termination or the second gesture was detected. In executing the task, computing device 100 does not display the default or primary user interface for the application. Instead, computing device 100 displays, using presence-sensitive display 140, a user interface associated with the selected task. For example, a compose email user interface that, in some instances, may include a "to" line already populated with an email address of a user associated with the selected task shortcut. That is, the computing device may dynamically suggest tasks associated with a particular application and present the suggested tasks in response to detecting a gesture at an icon associated with the particular application such that the computing device does not need to display the primary user interface for the application in order to perform a suggested task.

In some examples, after UI module 152 causes contextual task shortcut menu 122 to be displayed within GUI 120A, presence-sensitive display 140 may detect a second gesture, such as a drag gesture. As shown in FIG. 1B, the second gesture is initiated within a portion of GUI 120B that includes contextual task shortcut 124A and is terminated at a different location of GUI 120B. In this example, by dragging contextual task shortcut 124A to the different location, computing device 100 may create a shortcut icon within GUI 120B for the contextual task and UI module 152 may output an updated GUI, e.g., GUI 120C of FIG. 1C, that includes the shortcut icon (e.g., shortcut icon 128). In this way, techniques of this disclosure may enable a user to simply select the shortcut icon to initiate the corresponding task.

Figure 2:
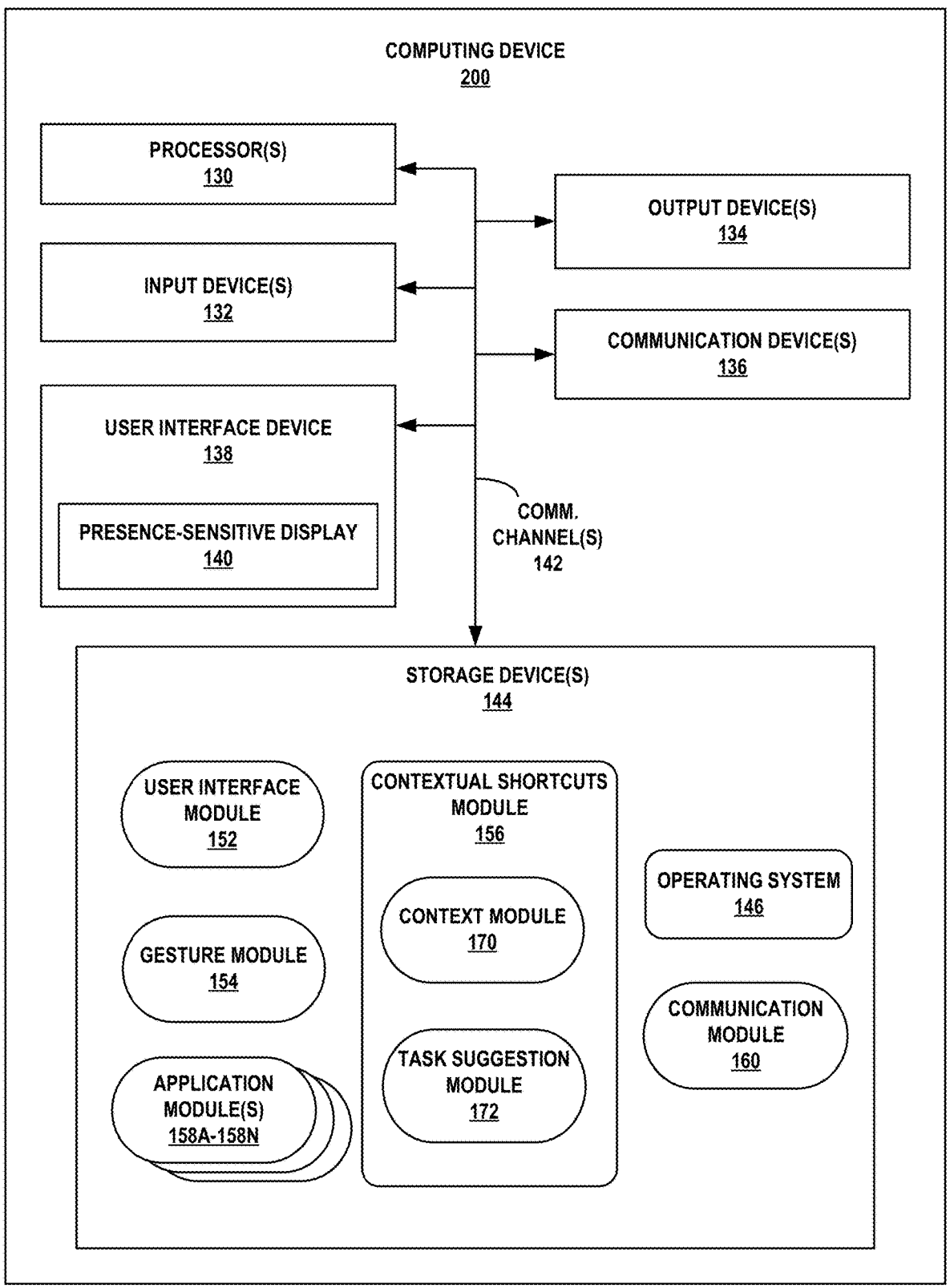
FIG. 2 is a block diagram illustrating an example computing device that is configured to provide contextual task shortcuts, in accordance with one or more aspects of the present disclosure.

FIG. 2 is a block diagram illustrating an example computing device that is configured to provide contextual task shortcuts, in accordance with one or more aspects of the present disclosure. Computing device 200 is a more detailed example of computing device 100 of FIG. 1. FIG. 2 illustrates only one particular example of computing device 200, and many other examples of computing device 200 may be used in other instances and may include a subset of the components included in example computing device 200 or may include additional components not shown in FIG. 2.

Figure 3:
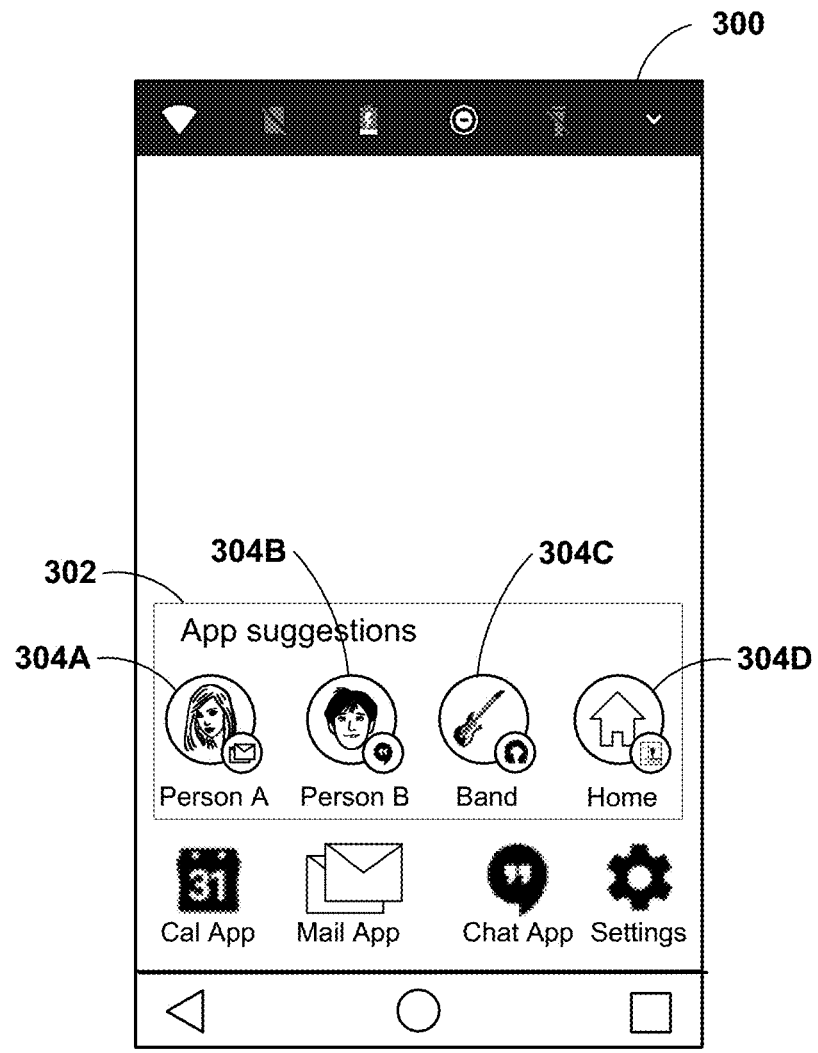
FIG. 3 is a conceptual diagram illustrating an example graphical user interface presented by an example computing device that is configured to provide contextual task shortcuts, in accordance with one or more aspects of the present disclosure.

As shown in FIG. 2, computing device 200 includes one or more processors 130, one or more input devices 132, one or more output devices 134, one or more communication devices 136, user interface device 138, and one or more storage devices 144. In the example of FIG. 3, user interface device 138 includes presence-sensitive display 140. Also in this example, storage devices 144 include operating system 146, user interface module 152, gesture module 154, contextual shortcuts module 156, application modules 158A-158N, and communication module 160. As shown in FIG. 2, contextual shortcuts module 156 includes context module 170 and task suggestion module 172. As also shown in FIG. 2, the various components of computing device 100 are interconnected via one or more communication channels 142 (e.g., one or more signals, or signal "busses," or communication interfaces).

Processors 130 may be configured to implement functionality and/or process instructions for execution within computing device 200. For example, processors 130 may process instructions stored in storage devices 144 (e.g., within a subset of storage devices 144 allocated for storing the instructions, such as one or more volatile and/or non-volatile memory devices). Such instructions may include components of operating system 146, as well as user interface module 152, gesture module 154, contextual shortcuts module 156, application modules 158A-158N, and communication module 160, also included within storage devices 144.

Input devices 132 may receive input from a user through tactile, audio, video, or biometric channels. Examples of input devices 132 may include a keyboard, mouse, touchscreen, presence-sensitive display, microphone, one or more still and/or video cameras, fingerprint reader, retina scanner, or any other device capable of detecting an input from a user or other source, and relaying the input to computing device 200 or components thereof. Output devices 134 of computing device 200 may be configured to provide output to a user through visual, auditory, or tactile channels. Output devices 134 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. Input devices 132 and/or output devices 134 also may include a discrete touchscreen and a display, or a touchscreen-enabled display, a presence-sensitive display, or other I/O capable displays known in the art. In this disclosure, although input devices 132 and/or output devices 134 are described as being separate from user interface device 138 described in greater detail below, one or more of input devices 132 and output devices 134, or any components thereof, may be integrated within user interface device 138 and various components thereof (e.g., within presence-sensitive display 140), in any manner.

User interface device 138, which includes presence-sensitive display 140, may be configured to, in conjunction with user interface module 152 and/or gesture module 154, implement the functionality of computing device 200 that relates to outputting, for display at presence-sensitive display 140 a GUI (e.g., GUIs 120A-120C of FIGS. 1A-1C) that includes one or more contextual task shortcuts and receiving an indication of a gesture detected at presence-sensitive display 140 (e.g., with the assistance of gesture module 154), and outputting, for display at presence-sensitive display 140 and in response to receiving the indication of the gesture, a modified GUI that includes a task shortcut icon. For example, user interface device 138 may comprise any suitable arrangement of hardware, software, firmware, or any combination thereof, to perform the techniques attributed to user interface device 138 in this disclosure.

In general, user interface device 138 may include any of one or more microprocessors, microcontrollers, digital signal processors (DSPs), application specific integrated circuits (ASICs), field programmable gate arrays (FPGAs), or any other equivalent integrated or discrete logic circuitry, as well as any combination of such components. Furthermore, user interface device 138 may include various types of analog circuitry, in addition to, or in place of, the logic devices and circuitry described above, as well as any number of mechanical, electro-mechanical, and structural hardware and components. Also, as described above with reference to FIG. 1, presence-sensitive display 140 may include any of a discrete LCD monitor, LED monitor, and CRT monitor, along with a discrete touchscreen (e.g., a resistive or capacitive touchscreen), or a touchscreen-enabled display, a presence-sensitive display, or any other I/O capable display known in the art.

In some examples, computing device 200 may use communication devices 136, in conjunction with communication module 160, to communicate with other devices via one or more networks, such as one or more wired or wireless networks. Communication devices 136, which may be referred to as a network interface, may include a network interface card, such as an Ethernet card, an optical transceiver, a radio frequency transceiver, or any other type of device that can send and receive information. Other examples of communication devices 136 may include Bluetooth®, 3G, 4G, and WiFi® radios in mobile computing devices, as well as a universal serial bus (USB) port. In some examples, computing device 200 may use communication devices 136 to wirelessly communicate with other, e.g., external, devices over a wireless network.

Storage devices 144 may include one or more computer-readable storage media. For example, storage devices 144 may be configured for long-term, as well as short-term storage of information, such as, e.g., instructions, data, or other information used by computing device 200. In some examples, storage devices 144 may include non-volatile storage elements. Examples of such non-volatile storage elements include magnetic hard discs, optical discs, solid state discs, floppy discs, flash memories, forms of electrically programmable memories (e.g., EPROMs), or electrically erasable and programmable memories (e.g., EEPROMs), as well as other forms of non-volatile memories known in the art. In other examples, in place of, or in addition to the non-volatile storage elements, storage devices 144 may include one or more so-called "temporary" memory devices, meaning that a primary purpose of these devices may not be long-term data storage. For example, the devices may comprise volatile memory devices, meaning that the devices may not maintain stored contents when the devices are not receiving power. Examples of volatile memory devices include random access memories (RAM), dynamic random access memories (DRAM), static random access memories (SRAM), and other forms of volatile memories, or memory devices, known in the art. In some examples, the devices may store program instructions for execution by processors 130. For example, the devices may be used by software (e.g., operating system 146) or applications (e.g., one or more of application modules 158A-158N) executing on computing device 200 to temporarily store information during program execution.

Operating system 146 may control one or more functionalities of computing device 100 and/or components thereof. For example, operating system 146 may interact with any of user interface module 152, gesture module 154, contextual shortcuts module 156, application modules 158A-158N, and communication module 160 and may facilitate one or more interactions between the respective modules and processors 130, input devices 132, output devices 134, communication devices 136, and user interface device 138 (including presence-sensitive display 140). Although not shown in FIG. 2, operating system 146 may interact with, or be otherwise coupled to, any of the modules described above, as well as to any components thereof. In some examples, one or more of the modules described above may be included within (or be otherwise provided by) operating system 146. Additionally, in some instances, computing device 200 also may use communication devices 136 to access and implement the functionalities provided by computing device 200 and its components, as described above, through methods commonly known as "cloud computing."

In general, computing device 200 may include any combination of one or more processors, one or more FPGAs, one or more ASICs, and one or more application specific standard products (ASSPs). Computing device 200 also may include memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors, FPGAs, ASICs, or ASSPs, to perform the GUI graphical element expansion and collapsing techniques described herein. Thus, computing device 200 may represent hardware, or a combination of hardware and software, to support the described components, modules, or elements, and the techniques should not be strictly limited to any particular embodiment described herein. Computing device 200 also may include one or more additional components not shown in FIG. 2, such as a global positioning system (GPS) receiver, and a radio frequency identification (RFID) reader, among other components, as well as one or more additional processors, input devices, output devices, communication devices (e.g., so-called "network interfaces"), user interface devices, storage devices, power sources, and so forth.

In the example shown in FIG. 2, contextual shortcuts module 156 includes context module 170 and task suggestion module 172. Context module 170 may generate a context associated with computing device 200. Context module 170 may collect contextual information associated with computing device 200 to define a context of computing device 200. Context module 170 may be configured to define any type of context that specifies the characteristics of the physical and/or virtual environment of computing device 200 at a particular time, such as in response to detecting user input at a location of presence-sensitive display 140 at which an application icon is displayed. For example, in response to presence-sensitive display 140 detecting a gesture at a location of an icon associated with a chat application (e.g., the icon labeled "Chat App" as shown in FIG. 1A), context module 170 may analyze various virtual and/or physical environmental characteristics that computing device 200 and the user of computing device 200 may be experiencing. As one example, context module 170 may determine that a context of computing device 200 includes the fact that it is 6:58 pm on a Tuesday, computing device 200 is located at a home residence of the user of computing device 200, based on a message history of the user, the user typically messages a friend to remind the friend that a particular TV show is about to start, and the particular TV show is scheduled to begin playing at 7:00 pm.

Based on such contextual information collected by context module 170, task suggestion module 172 may dynamically determine one or more task shortcuts for actions of one or more applications executable by computing device 200. For example, given such a context of computing device 200, task suggestion module 172 may determine, for a messaging application, that the contextual task shortcut list should include a task shortcut for sending the friend the message "Hey, the show is about to start!" using a messaging application. In this example, the action of the application is sending a message, the target entity is the friend, and the information associated with the action and target entity is the message "Hey, the show is about to start!" As another example, task suggestion module 172 may determine, for a calendar application, that the contextual task shortcut list should include a task to create a periodic calendar reminder for 6:45 pm to remind the friend that the show is about to start. In this example, the action of the application is creating the calendar reminder, the target entity is the friend, and the information associate with the action and the target entity is 6:45 pm, once per week, and the text to remind the friend that the show is on.

At a later time, perhaps the next day, context module 170 may determine that the context of computing device 200 includes a location of computing device 200 associated with a workplace of the user of computing device 200, no meetings scheduled for the next hour, the time of day is 9:00 am, and an application usage history. Based on this context, task suggestion module 172 may determine that the user may like to listen to acoustic music and determine a task shortcut that includes playing an acoustic music playlist using a music application.

In some examples, task suggestion module 172 may determine different tasks provided by each application executable by computing device 200 (e.g., application modules 158) via an application programming interface (API) provided by operating system 146. That is, operating system 146 may provide a mechanism (e.g., an API) by which developers of the various applications may provide an indication of various types of tasks performable by the application. For example, a mail application may provide an indication that a user may compose and send an email message using the mail application while a music application may provide an indication that the user may listen to various playlists using the music application. In this way, task suggestion module 172 may use information provided by operating system 146 to identify candidate tasks associated with each application. Task suggestion module 172 may select one or more of the candidate tasks and determine various parameters (e.g., contact names and addresses, playlist names, geographic addresses of a destination, etc.) for the suggested contextual task shortcuts.

FIG. 3 is a conceptual diagram illustrating an example graphical user interface presented by an example computing device that is configured to provide contextual task shortcuts, in accordance with one or more aspects of the present disclosure. FIG. 3 is described below in the context of computing device 200 of FIG. 2.

In various examples, computing device 200 may be configured to provide contextual task shortcuts directly within GUI 300. That is, rather that requiring a user to select a particular application icon to cause a task shortcut menu (e.g., task shortcut menu 122 of FIG. 1) to be presented, computing device 200 may determine one or more contextual task shortcuts and dynamically generate icons (e.g., task shortcut icons 304A-304D) within GUI 300 such that a user may directly select the task shortcut icon to begin the corresponding task.

As shown in FIG. 3, GUI 300 includes task suggestion region 302 and task shortcut icons 304A-304D (collectively, "task shortcut icons 304"). While shown as including a set of four task suggestion icons 304, task suggestion region 302 may include multiple sets of task shortcut icons and may include any number of task suggestion icons. Task suggestion module 172 may dynamically generate task shortcut icons 304, such as in response to context module 170 determining a change in context of computing device 200 or in response to a user activating presence-sensitive display 140, as non-limiting examples.

For the set of task shortcut icons 304 included in task suggestion region 302, task suggestion module 172 determined, based on the context of computing device 200 as determined by context module 170, that a user of computing device 200 may want to email person A (e.g., as indicated by task shortcut icon 304A), send a message to person B (e.g., as indicated by task shortcut icon 304B), listen to music from a band (e.g., as indicated by task shortcut icon 304C), and want driving directions to a home residence of the user (e.g., as indicated by task shortcut icon 304D).

Each of task shortcut icons 304, as shown in FIG. 3, includes a visual indication of the noun associated with the task and a visual indication of the application associated with the task. For example, task shortcut icon 304A includes an image of person A and an icon of an email application executable by computing device 200. As another example, task shortcut icon 304B includes an image of person B and an icon of a messaging application executable by computing device 200. Task shortcut icon 304C includes a guitar icon (e.g., an image associated with a band) and an icon of a music application executable by computing device 200. Lastly, task shortcut icon 304D includes an icon of a home and an icon of a mapping or navigation application executable by computing device 200.

The example set of task shortcut icons 304 may be a first set of task shortcut icons 304 that are generated based on a current context of computing device 200. However, as the context of computing device 200 changes (e.g., as determined by context module 170), contextual shortcuts module 156 may change, remove, or add one or more task shortcut icons to the set of task shortcut icons 304. That is, in general, context shortcuts module 156 may regularly check for updated contextual information and update the task shortcut icons 304 included within GUI 300 in response to determining, based on the updated contextual information, that the context of computing device 200 has changed.

For example, as shown in FIG. 3, task suggestion region 302 includes task shortcut icon 304C associated with a music application executable by computing device 200. Contextual shortcuts module 156 may have previously determined that the music application task shortcut icon 304C should be included based on a previous context of computing device 200 that included contextual information indicating that a headphone or other speaker was connected to computing device 200. However, if a user disconnects the headphone or other speaker from computing device 200, context module 170 may generate updated contextual information indicating that the headphone has been disconnected. Contextual shortcuts module 156 may determine that a different task shortcut icon should be displayed in place of the music application task shortcut icon 304C or that the music application task shortcut icon 304C should be removed from task suggestion region 302 and not replaced with a different task shortcut icon such that fewer task shortcut icons 304 are included within task suggestion region 302.

As another example, if a new application is installed at computing device 200, context module 170 may determine that a user of computing device 200 is likely to want to use the newly installed application. As such, contextual shortcuts module 156 may add a new task shortcut icon 304 within task suggestion region 302 or change one of existing task shortcut icons 304. In determining which task to associate with the new task shortcut icon for the newly installed application, contextual shortcuts module 156 may analyze behaviors of other users who installed the new application. For example, a particular feature (e.g., a tutorial, a sharing feature, an image capture feature, authentication feature, a data import feature, etc.) may be a most commonly accessed feature for new users of the application. As another example, contextual shortcuts module 156 may analyze which features are generally the most commonly used features for all users of the new application, not just new users of the new application.

In examples where contextual shortcuts module 156 changes an existing one of task shortcut icons 304 (i.e., replaces one of task shortcut icons 304 with a different task shortcut icon), contextual shortcuts module 156 may select which existing task shortcut icon 304 to replace based at least in part on a comparative relevance score of each existing task shortcut icon 304 to a current context of computing device 200. For example, if a user was watching a streaming video and then switched to a different application (e.g., a messaging application to respond to a message from user A), contextual shortcuts module 156 may determine than a messaging-related task shortcut item for user A has the lowest relevance score to the current context of computing device 200. Instead, contextual shortcuts module 156 may determine that a new task shortcut for resuming play of the streaming video is particularly relevant to the current context of computing device 200 and update the task shortcut icon to be associated with the video player application and resuming playback of the streaming video.

Contextual shortcuts module 156 may change an appearance of all or apportion of each task shortcut icon 304. For example, if a user associated with task shortcut icon 304A updates a profile image, contextual shortcut modules 156 may automatically retrieve the updated profile image and replace the image of the person included within task shortcut icon 304A with the updated profile image. As another example, contextual shortcut module 156 may update the icon indicative of the application associated with the particular task shortcut 304. If a user regularly messages Person A instead of sending Person A emails, contextual shortcuts module 156 may update the application associated with task shortcut icon 304A to be a messaging application and may update the appearance of task shortcut icon 304A to include a graphical indication of the messaging application instead of the graphical indication of the email application.

While these examples are specifically described, contextual shortcuts module 156 may change the task shortcut icons included within GUI 300 based on other context changes. including, for example, whether a user is driving or riding in a car, a change in semantic location of the user (e.g., at work, at lunch, at home, etc.), a change in a determined activity of the user (e.g., walking, running, bicycling, etc.), etc. Contextual shortcuts module 156 may also update the included task shortcut icons 304 based on user behavior history, including recency and frequency of use of each particular task shortcut icon 304 as well as other features and applications of computing device 200. In general, contextual shortcuts module 156 may apply neural networks to the various contextual information to predict the particular task shortcut icons a user may want for a particular context and may apply machine learning techniques to refine the selection of the task shortcut icons included within GUI 300. In this way, contextual shortcuts module 156 may continually or periodically update the task shortcut icons 304 included within GUI 300.

Figure 4:
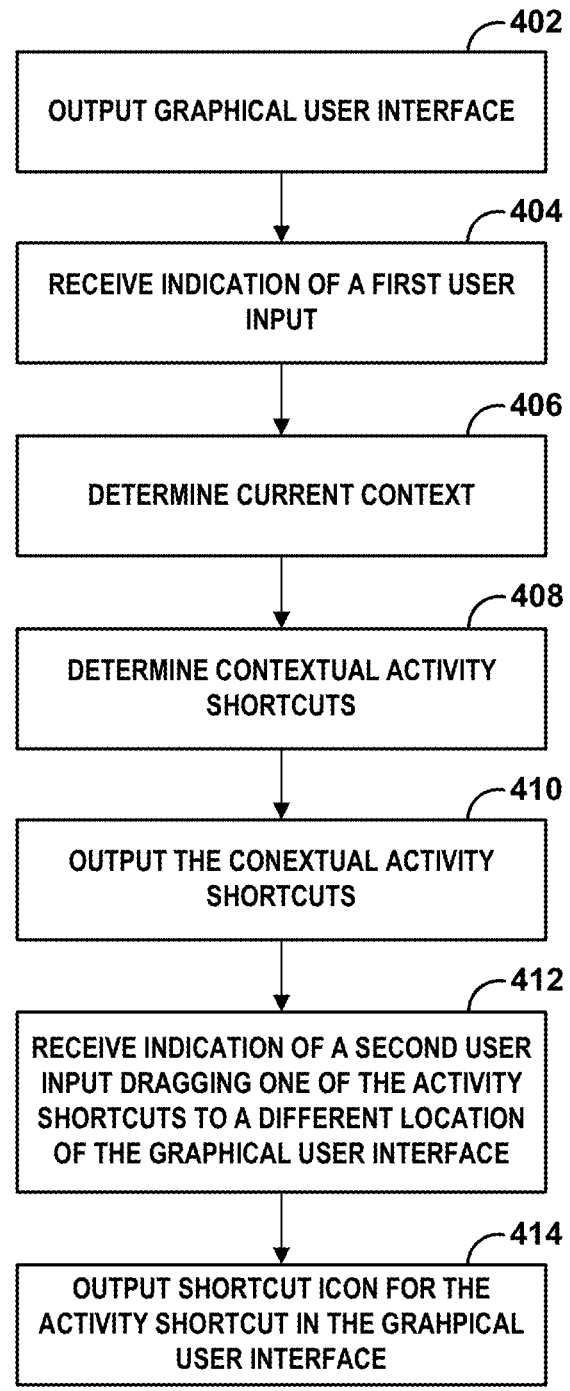
FIG. 4 is a flowchart illustrating example operations performed by an example computing device that is configured to provide contextual task shortcuts, in accordance with one or more aspects of the present disclosure.

FIG. 4 is a flowchart illustrating example operations performed by an example computing device, such as computing device 100 of FIG. 1A or computing device 200 of FIG. 2, that is configured to provide contextual task shortcuts, in accordance with one or more aspects of the present disclosure. FIG. 4 is described below in the context of computing device 100 and GUIs 120A-102C of FIGS. 1A-1C.

Computing device 100 may output a graphical user interface (e.g., GUI 120A) for display at presence-sensitive display 140 (402). The graphical user interface may include one or more icons each of which may be associated with an application installed at or executable by computing device 100. As shown in FIG. 1, the icons include a calendar application icon, a mail application icon, a chat application icon, and a setting application icon.

Presence-sensitive display 140 may detect a first user input at a location of presence-sensitive display 140 associated with one of the application icons and may provide an indication of the first user input to computing device 100 (e.g., to gesture module 154 and/or user interface module 152) (404). Gesture module 154 may determine a type of the gesture (e.g., a tap, drag, swipe, tap and hold, etc. gesture) and UI module 152 may determine an action associated with the location of presence-sensitive display 140 and the type of the gesture determined by gesture module 154.

Responsive to determining that the action includes outputting contextual task shortcut menu 122, contextual shortcuts module 156 may determine a current context of computing device 100 (406). While described as determining a current context of computing device 100 in response to receiving the first user input, contextual shortcuts module 156 may determine the context of computing device 100 at other times and may not update the determined context of computing device 100 in response to receiving the indication of the first user input. For example, contextual shortcuts module 156 may periodically (e.g., every minute, every five minutes, every 20 minutes, every hour, etc.) determine the context of computing device 100 and a most recently determined context of computing device 100 may be considered the current context of computing device 100.

Based on the current context of computing device 100, contextual shortcuts module 156 may determine one or more task shortcuts 124 to include within contextual task shortcut menu 122 (408). For example, if a user of computing device recently received an email that includes an invitation to an event (i.e., the current context of computing device 100 includes an indication of the recently received email), contextual shortcuts module 156 may determine that a task shortcut for adding the event should be included within a contextual task shortcut menu associated with a calendar application. In the example shown in FIG. 1, contextual shortcuts module 156 determines that task shortcuts for sending an email to a work email address of person A (i.e., task shortcut 124A) and for sending an email to a home email address of person B (i.e., task shortcut 124B) should be included within contextual task shortcut menu 122.

UI module 152 may output the contextual task shortcut menu 122 and task shortcuts 124 within GUI 120A (410). Presence-sensitive display 140 may detect a second user input (e.g., a second gesture) and may provide an indication of the second user input to computing device 100 (e.g., to gesture module 154 and/or user interface module 152). Gesture module 154 may determine a type of the gesture (e.g., a tap, drag, swipe, tap and hold, etc. gesture) and UI module 152 may determine an action associated with the location of presence-sensitive display 140 and the type of the gesture determined by gesture module 154.

For example, computing device 100 may receive an indication of that second user input, which may be a drag gesture that was initiated at a location of presence-sensitive display 140 associated with a portion of contextual task shortcut menu 122 associated with a particular task shortcut (e.g., task shortcut 124A) and terminated at a location of a graphical user interface (e.g., GUI 120B) other than the location of the icon and the location of contextual task shortcut menu 122 (412). Responsive to receiving the indication of the second user input, UI module 152 may output an updated GUI (e.g. GUI 120C) that includes a shortcut icon (e.g., shortcut icon 128) (414).

Example 1

A method comprising: outputting, by the mobile computing device and for display at a presence-sensitive display, a graphical user interface including at least an icon associated with an application executable by the mobile computing device; receiving, by the mobile computing device and from the presence-sensitive display, an indication of a first user input detected by the presence-sensitive display at a location of the the presence-sensitive display associated with the icon; and responsive to receiving the indication of the first user input: outputting, by the mobile computing device and for display at the presence-sensitive screen, a graphical element including at least one task shortcut from a plurality of task shortcuts for the application, wherein each task shortcut from the plurality of task shortcuts is associated with a respective action of the application; receiving, by the mobile computing device and from the presence-sensitive display, an indication of a second user input that selects a particular task shortcut from the at least one task shortcut included in the graphical element, wherein the second user input is initiated at a location of the presence-sensitive display associated with a portion of the graphical element associated with the particular task shortcut and terminates at a location of the graphical user interface other than a location of the icon and a location of the graphical element; and responsive to receiving the indication of the second user input, outputting, by the mobile computing device, a shortcut icon for the particular task shortcut and within the graphical user interface.

Example 2

The method of example 1, further comprising: determining, by a mobile computing device, a context of the mobile computing device; and dynamically determining, by the mobile computing device and based on the context, the plurality of task shortcuts for the application.

Example 3

The method of example 2, wherein the plurality of tasks shortcuts is a first plurality of task shortcuts, and wherein the graphical element is a first graphical element, the method further comprising: after determining the context, determining, by the mobile computing device, an updated context of the mobile computing device, wherein the updated context is different from the context; and dynamically determining, by the mobile computing device and based on the updated context, a second plurality of task shortcuts for the application, wherein the first plurality of task shortcuts includes at least one task not included in the second plurality of task shortcuts.

Example 4

The method of example 3, wherein the updated context is different from the context by being determined based on one or more of updated sensor information, updated time and date information, updated sensor information, or updated application usage information.

Example 5

The method of any of examples 2-3, wherein the plurality of task shortcuts includes a portion of all task shortcuts for the application, and wherein dynamically determining the plurality of task shortcuts comprises: determining, by the mobile computing device and based on the context, a respective relevance score for the task shortcuts for the application; and selecting, by the mobile computing device and based on the respective relevance scores for the task shortcuts, the plurality of task shortcuts from all of the task shortcuts, wherein the respective relevance scores for the plurality of task shortcuts are greater than the respective relevance scores for other task shortcuts not included in the plurality of task shortcuts.

Example 6

The method of any of examples 2-5, wherein the context of the mobile computing device includes one or more of sensor information, communication information, application usage information, and time and date information.

Example 7

The method of any of examples 2-6, wherein at least one task shortcut from the plurality of task shortcuts includes the respective action of the application, a target entity of the action, and information associated with the action and the target entity.

Example 8

The method of any of examples 1-7, wherein the graphical user interface includes an icon associated with a different application executable by the mobile computing device, wherein the plurality of tasks shortcuts is a first plurality of task shortcuts, and wherein the graphical element is a first graphical element, the method further comprising: receiving, by the mobile computing device and from the presence-sensitive display, an indication of a third user input detected by the presence-sensitive display at a location of the presence-sensitive display associated with the icon associated with the different application; and responsive to receiving the indication of the third user input, outputting, by the mobile computing device and for display at the presence-sensitive screen, a second graphical element including at least one task shortcut from a second plurality of task shortcuts for the application, wherein each task shortcut from the second plurality of task shortcuts is associated with a respective action of the application, and wherein the first plurality of shortcuts includes at least one task shortcut not included in the second plurality of task shortcuts.

Example 9

The method of any of examples 1-8, wherein the plurality of task shortcuts includes a portion of task shortcuts associated with the application.

Example 10

The method of any of examples 1-9, wherein the first user input comprises one of hover gesture, a tap and hold gesture, a hard press gesture, or a swipe up gesture.

Example 11

A computing device comprising: one or more processors; a presence-sensitive display; and a storage device that stores one or more modules executable by the one or more processors to: output, for display at the presence-sensitive display, a graphical user interface including at least an icon associated with an application executable by the mobile computing device; receive, from the presence-sensitive display, an indication of a first user input detected by the presence-sensitive display at a location of the presence-sensitive display associated with the icon; and responsive to receiving the indication of the first user input: output, for display at the presence-sensitive screen, a graphical element including at least one task shortcut from a plurality of task shortcuts for the application, wherein each task shortcut from the plurality of task shortcuts is associated with a respective action of the application; receive, from the presence-sensitive display, an indication of a second user input that selects a particular task shortcut from the at least one task shortcut included in the graphical element, wherein the second user input is initiated at a location of the presence-sensitive display associated with a portion of the graphical element associated with the particular task shortcut and terminates at a location of the graphical user interface other than a location of the icon and a location of the graphical element; and responsive to receiving the indication of the second user input, output, for display by the presence-sensitive display, a shortcut icon for the particular task shortcut and within the graphical user interface.

Example 12

The computing device of example 11, wherein the one or more modules are further executable by the one or more processors to: determine a context of the mobile computing device; and determine, based on the context, the plurality of task shortcuts for the application.

Example 13

The computing device of example 12, wherein: the plurality of tasks shortcuts is a first plurality of task shortcuts, the graphical element is a first graphical element, and the one or more modules are further executable by the one or more processors to: after determining the context, determine an updated context of the computing device, wherein the updated context is different from the context; and determine, based on the updated context, a second plurality of task shortcuts for the application, wherein the first plurality of task shortcuts includes at least one task not included in the second plurality of task shortcuts.

Example 14

The computing device of example 13, wherein the updated context is different from the context by being determined based on one or more of updated sensor information, updated time and date information, updated sensor information, or updated application usage information.

Example 15

The computing device of any of examples 12-14, wherein: the plurality of task shortcuts includes a portion of all task shortcuts for the application, and the one or more modules are further executable by the one or more processors to: determine, based on the context, a respective relevance score for the task shortcuts for the application; and select, based on the respective relevance scores for the task shortcuts, the plurality of task shortcuts from all of the task shortcuts, wherein the respective relevance scores for the plurality of task shortcuts are greater than the respective relevance scores for other task shortcuts not included in the plurality of task shortcuts.

Example 16

The computing device of any of examples 11-15, wherein: the graphical user interface includes an icon associated with a different application executable by the computing device, the plurality of tasks shortcuts is a first plurality of task shortcuts, the graphical element is a first graphical element, and the one or more modules are further executable by the one or more processors to: receive, from the presence-sensitive display, an indication of a third user input detected by the presence-sensitive display at a location of the presence-sensitive display associated with the icon associated with the different application; and responsive to receiving the indication of the third user input, output, for display at the presence-sensitive screen, a second graphical element including at least one task shortcut from a second plurality of task shortcuts for the application, wherein each task shortcut from the second plurality of task shortcuts is associated with a respective action of the application, and wherein the first plurality of shortcuts includes at least one task shortcut not included in the second plurality of task shortcuts.

Example 17

A computer-readable storage medium encoded with instructions that, when executed, cause one or more processors of a computing device to: output, for display at a presence-sensitive display, a graphical user interface including at least an icon associated with an application executable by the mobile computing device; receive, from the presence-sensitive display, an indication of a first user input detected by the presence-sensitive display at a location of the the presence-sensitive display associated with the icon; and responsive to receiving the indication of the first user input: output, for display at the presence-sensitive screen, a graphical element including at least one task shortcut from a plurality of task shortcuts for the application, wherein each task shortcut from the plurality of task shortcuts is associated with a respective action of the application; receive, from the presence-sensitive display, an indication of a second user input that selects a particular task shortcut from the at least one task shortcut included in the graphical element, wherein the second user input is initiated at a location of the presence-sensitive display associated with a portion of the graphical element associated with the particular task shortcut and terminates at a location of the graphical user interface other than a location of the icon and a location of the graphical element; and responsive to receiving the indication of the second user input, output, for display by the presence-sensitive display, a shortcut icon for the particular task shortcut and within the graphical user interface.

Example 18

The computer-readable storage medium of example 17, wherein the instructions further cause the one or more processors to: determine a context of the mobile computing device; and determine, based on the context, the plurality of task shortcuts for the application.

Example 19

The computer-readable storage medium of any of examples 17-18, wherein: the plurality of tasks shortcuts is a first plurality of task shortcuts, the graphical element is a first graphical element, and the instructions further cause the one or more processors to: after determining the context, determine an updated context of the computing device, wherein the updated context is different from the context; and determine, based on the updated context, a second plurality of task shortcuts for the application, wherein the first plurality of task shortcuts includes at least one task not included in the second plurality of task shortcuts.

Example 20

The computer-readable storage medium of any of examples 17-19, wherein: the graphical user interface includes an icon associated with a different application executable by the computing device, the plurality of tasks shortcuts is a first plurality of task shortcuts, the graphical element is a first graphical element, and the instructions further cause the one or more processors to: receive, from the presence-sensitive display, an indication of a third user input detected by the presence-sensitive display at a location of the presence-sensitive display associated with the icon associated with the different application; and responsive to receiving the indication of the third user input, output, for display at the presence-sensitive screen, a second graphical element including at least one task shortcut from a second plurality of task shortcuts for the application, wherein each task shortcut from the second plurality of task shortcuts is associated with a respective action of the application, and wherein the first plurality of shortcuts includes at least one task shortcut not included in the second plurality of task shortcuts.

Example 21

A computing device comprising means for performing any of the methods of example 1-10.

Example 22

A computer-readable storage medium comprising instructions that, when executed cause at least one processor of a computing device to perform any of the methods of examples 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
outputting, by a mobile computing device and for display at a presence-sensitive display, a graphical user interface including at least an icon associated with an application executable by the mobile computing device;
receiving, by the mobile computing device and from the presence-sensitive display, an indication of a first user input detected by the presence-sensitive display at a location of the presence-sensitive display associated with the icon;
determining, by the mobile computing device, a context of the mobile computing device, wherein the context specifies at least one virtual environmental characteristic or physical environmental characteristic and includes one or more of a location of the mobile computing device, sensor information, or time and date information, and wherein the sensor information is generated by one or more of a position sensor, an accelerometer, a gyroscope, a barometer, an ambient light sensor, a proximity sensor, or a microphone; and
responsive to receiving the indication of the first user input:
dynamically determining, by the mobile computing device and based on the context, a plurality of task shortcuts for the application, wherein each task shortcut from the plurality of task shortcuts is associated with a respective action of the application;
outputting, by the mobile computing device and for display at the presence-sensitive screen, a task shortcut menu including at least one task shortcut from the plurality of task shortcuts for the application; and
receiving, by the mobile computing device and from the presence-sensitive display, an indication of a second user input that selects a particular task shortcut from the at least one task shortcut included in the task shortcut menu, wherein the second user input is initiated at a location of the presence-sensitive display associated with a portion of the task shortcut menu associated with the particular task shortcut.

2. The method of claim 1, wherein the plurality of tasks shortcuts is a first plurality of task shortcuts, the method further comprising:
after determining the context, determining, by the mobile computing device, an updated context of the mobile computing device, wherein the updated context is different from the context; and
dynamically determining, by the mobile computing device and based on the updated context, a second plurality of task shortcuts for the application, wherein the first plurality of task shortcuts includes at least one task not included in the second plurality of task shortcuts.

3. The method of claim 2, wherein the updated context is different from the context, wherein the updated context is determined based on one or more of updated sensor information, updated time and date information, updated communication information, or updated application usage information.

4. The method of claim 1, further comprising:
after determining the context, determining, by the mobile computing device, an updated context of the mobile computing device, wherein the updated context is different from the context;
determining, based on the updated context of the mobile computing device, an updated respective relevance score for each task shortcut from the plurality of task shortcuts for the application;
determining, by the mobile computing device and based on the updated respective relevance scores for the plurality of task shortcuts, an updated order of the plurality of task shortcuts for the application;
selecting, by the mobile computing device and based on the respective relevance scores for the plurality of task shortcuts, an updated portion of the plurality of shortcuts; and
outputting, by the mobile device and for display, an updated task shortcut menu including the updated portion of the plurality of shortcuts in the updated order.

5. The method of claim 1, wherein at least one task shortcut from the plurality of task shortcuts includes the respective action of the application, a target entity of the action, and information associated with the action and the target entity.

6. The method of claim 1, wherein the graphical user interface includes an icon associated with a different application executable by the mobile computing device, wherein the plurality of tasks shortcuts is a first plurality of task shortcuts, and wherein the task shortcut menu is a first task shortcut menu, the method further comprising:
receiving, by the mobile computing device and from the presence-sensitive display, an indication of a third user input detected by the presence-sensitive display at a location of the presence-sensitive display associated with the icon associated with the different application; and
responsive to receiving the indication of the third user input, outputting, by the mobile computing device and for display at the presence-sensitive display, a second task shortcut menu including at least one task shortcut from a second plurality of task shortcuts for the application, wherein each task shortcut from the second plurality of task shortcuts is associated with a respective action of the application, and wherein the first plurality of shortcuts includes at least one task shortcut not included in the second plurality of task shortcuts.

7. The method of claim 1, further comprising:
responsive to receiving the indication of the first user input:
determining, by the mobile computing device and based on the context of the mobile computing device, a respective relevance score for each task shortcut from the plurality of task shortcuts for the application;
determining, by the mobile computing device and based on the respective relevance scores for the plurality of task shortcuts, an order of the plurality of task shortcuts for the application; and
selecting, by the mobile computing device and based on the respective relevance scores for the plurality of task shortcuts, the at least one task shortcut from the plurality of task shortcuts included within the task shortcut menu,
wherein the at least one task shortcut from the plurality of task shortcuts for the application included in the task shortcut menu is ordered in accordance with the order.

8. The method of claim 7,
wherein the plurality of task shortcuts includes a portion of all task shortcuts for the application, and
wherein the respective relevance scores for the plurality of task shortcuts are greater than the respective relevance scores for other task shortcuts not included in the plurality of task shortcuts.

9. The method of claim 1, wherein the context is determined based on a user behavior history.

10. A computing device comprising:
one or more processors;
a presence-sensitive display; and
a storage device that stores one or more modules executable by the one or more processors to:
output, for display at the presence-sensitive display, a graphical user interface including at least an icon associated with an application executable by the computing device;
receive, from the presence-sensitive display, an indication of a first user input detected by the presence-sensitive display at a location of the presence-sensitive display associated with the icon;
determine a context of the computing device, wherein the context specifies at least one virtual environmental characteristic or physical environmental characteristic and one or more of a location of the computing device, sensor information, or time and date information, and wherein the sensor information is generated by one or more of a position sensor, an accelerometer, a gyroscope, a barometer, an ambient light sensor, a proximity sensor, or a microphone; and
responsive to receiving the indication of the first user input:
determine, based on the context, a plurality of task shortcuts for the application, wherein each task shortcut from the plurality of task shortcuts is associated with a respective action of the application;
output, for display at the presence-sensitive screen, a task shortcut menu including at least one task shortcut from the plurality of task shortcuts for the application; and
receive, from the presence-sensitive display, an indication of a second user input that selects a particular task shortcut from the at least one task shortcut included in the task shortcut menu, wherein the second user input is initiated at a location of the presence-sensitive display associated with a portion of the task shortcut menu associated with the particular task shortcut.

11. The computing device of claim 10, wherein:
the plurality of tasks shortcuts is a first plurality of task shortcuts, and
the one or more modules are further executable by the one or more processors to:
after determining the context, determine an updated context of the computing device, wherein the updated context is different from the context; and
determine, based on the updated context, a second plurality of task shortcuts for the application, wherein the first plurality of task shortcuts includes at least one task not included in the second plurality of task shortcuts.

12. The computing device of claim 11, wherein the updated context is different from the context, wherein the updated context is determined based on one or more of updated sensor information, updated time and date information, updated sensor information, or updated application usage information.

13. The computing device of claim 10, wherein:
the graphical user interface includes an icon associated with a different application executable by the computing device,
the plurality of tasks shortcuts is a first plurality of task shortcuts,
the task shortcut menu is a first task shortcut menu, and
the one or more modules are further executable by the one or more processors to:
receive, from the presence-sensitive display, an indication of a third user input detected by the presence-sensitive display at a location of the presence-sensitive display associated with the icon associated with the different application; and
responsive to receiving the indication of the third user input, output, for display at the presence-sensitive display, a second task shortcut menu including at least one task shortcut from a second plurality of task shortcuts for the application, wherein each task shortcut from the second plurality of task shortcuts is associated with a respective action of the application, and wherein the first plurality of shortcuts includes at least one task shortcut not included in the second plurality of task shortcuts.

14. The computing device of claim 10, wherein the one or more modules further are executable by the one or more processors to:
responsive to receiving the indication of the first user input:
determine, and based on the context of the computing device, a respective relevance score for each task shortcut from the plurality of task shortcuts for the application;
determine, based on the respective relevance scores for the plurality of task shortcuts, an order of the plurality of task shortcuts for the application; and
select, based on the respective relevance scores for the plurality of task shortcuts, the at least one task shortcut from the plurality of task shortcuts to include within the task shortcut menu,
wherein the at least one task shortcut from the plurality of task shortcuts for the application included in the task shortcut menu is ordered in accordance with the order.

15. The computing device of claim 14, wherein:
the plurality of task shortcuts includes a portion of all task shortcuts for the application, and
the respective relevance scores for the plurality of task shortcuts are greater than the respective relevance scores for other task shortcuts not included in the plurality of task shortcuts.

16. The computing device of claim 10, wherein the context is determined based on a user behavior history.

17. A computer-readable storage medium encoded with instructions that, when executed, cause one or more processors of a computing device to:
output, for display at a presence-sensitive display, a graphical user interface including at least an icon associated with an application executable by the computing device;
receive, from the presence-sensitive display, an indication of a first user input detected by the presence-sensitive display at a location of the presence-sensitive display associated with the icon;
determine a context of the computing device, wherein the context specifies at least one virtual environmental characteristic or physical environmental characteristic and includes one or more of a location of the computing device, sensor information, or time and date information, and wherein the sensor information is generated by one or more of a position sensor, an accelerometer, a gyroscope, a barometer, an ambient light sensor, a proximity sensor, or a microphone; and
responsive to receiving the indication of the first user input:
  determine, based on the context, a plurality of task shortcuts for the application, wherein each task shortcut from the plurality of task shortcuts is associated with a respective action of the application;
  output, for display at the presence-sensitive screen, a task shortcut menu including at least one task shortcut from the plurality of task shortcuts for the applications; and
  receive, from the presence-sensitive display, an indication of a second user input that selects a particular task shortcut from the at least one task shortcut included in the task shortcut menu, wherein the second user input is initiated at a location of the presence-sensitive display associated with a portion of the task shortcut menu associated with the particular task shortcut.

18. The computer-readable storage medium of claim 17, wherein:
  the plurality of tasks shortcuts is a first plurality of task shortcuts, and
  the instructions further cause the one or more processors to:
    after determining the context, determine an updated context of the computing device, wherein the updated context is different from the context; and
    determine, based on the updated context, a second plurality of task shortcuts for the application, wherein the first plurality of task shortcuts includes at least one task not included in the second plurality of task shortcuts.

19. The computer-readable storage medium of claim 17, wherein:
  the graphical user interface includes an icon associated with a different application executable by the computing device,
  the plurality of tasks shortcuts is a first plurality of task shortcuts,
  the task shortcut menu is a first task shortcut menu, and
  the instructions further cause the one or more processors to:
    receive, from the presence-sensitive display, an indication of a third user input detected by the presence-sensitive display at a location of the presence-sensitive display associated with the icon associated with the different application; and
    responsive to receiving the indication of the third user input, output, for display at the presence-sensitive display, a second task shortcut menu including at least one task shortcut from a second plurality of task shortcuts for the application, wherein each task shortcut from the second plurality of task shortcuts is associated with a respective action of the application, and wherein the first plurality of shortcuts includes at least one task shortcut not included in the second plurality of task shortcuts.

* * * * *